(12) United States Patent
Lewis

(10) Patent No.: US 12,415,586 B2
(45) Date of Patent: Sep. 16, 2025

(54) BALANCE ASSISTANCE AND FIREPROOFING DEVICE FOR SCOOTERS

(71) Applicant: Sasha Lewis, New York, NY (US)

(72) Inventor: Sasha Lewis, New York, NY (US)

( * ) Notice: Subject to any disclaimer, the term of this patent is extended or adjusted under 35 U.S.C. 154(b) by 0 days.

(21) Appl. No.: 18/640,972

(22) Filed: Apr. 19, 2024

(65) Prior Publication Data

US 2024/0351659 A1  Oct. 24, 2024

Related U.S. Application Data

(60) Provisional application No. 63/577,402, filed on Apr. 21, 2023.

(51) Int. Cl.
*B62K 11/00* (2006.01)
*A62C 3/07* (2006.01)

(52) U.S. Cl.
CPC .............. *B62K 11/007* (2016.11); *A62C 3/07* (2013.01); *B62K 2202/00* (2013.01)

(58) Field of Classification Search
CPC .... A62C 3/07; B62K 11/007; B62K 2202/00; B62H 1/10; B62H 1/12; B62H 7/00; A63B 69/16
See application file for complete search history.

(56) References Cited

U.S. PATENT DOCUMENTS

| | | | |
|---|---|---|---|
| 9,957,006 B2 | 5/2018 | Tinaphong | |
| 2009/0194960 A1* | 8/2009 | Peterson | B62K 3/002 |
| | | | 280/87.041 |
| 2013/0270016 A1* | 10/2013 | Donnell | B60L 50/66 |
| | | | 180/2.2 |

(Continued)

FOREIGN PATENT DOCUMENTS

| | | | |
|---|---|---|---|
| CN | 210956738 U | * | 7/2020 |
| CN | 219524118 U | | 8/2023 |
| KR | 102484843 B1 | * | 1/2023 |
| WO | 2020060422 A1 | | 3/2020 |

OTHER PUBLICATIONS

KR 102484843 B1 Machine English Translation (Year: 2023).*
CN-210956738-U Machine English Translation (Year: 2020).*

(Continued)

*Primary Examiner* — Jason D Shanske
*Assistant Examiner* — Matthew James O'Neill
(74) *Attorney, Agent, or Firm* — Morrison & Foerster LLP

(57) ABSTRACT

Disclosed herein are exemplary devices that provide balance assistance and fireproofing to electric scooters. The devices described herein can be clipped onto existing scooters, providing balance improvements via one or more training wheels and providing fireproofing improvements via one or more units containing fire-suppressant materials. A device may be attached to the center of a scooter's standing platform to improve the stability of the scooter and to provide fireproofing to the batteries. The device can include two training wheels, each positioned to an opposite side of the standing platform, to provide the vehicle with stability. The training wheels may be connected to an axle that is mounted to a fireproofing unit. The fireproofing unit, which contains fire-suppressant materials, can clamp to the standing platform, which contains at least a portion of the batteries. Users can adjust, reposition, and/or remove portions of the balance assistance and fireproofing device.

13 Claims, 9 Drawing Sheets

(56) References Cited

U.S. PATENT DOCUMENTS

| | | |
|---|---|---|
| 2018/0111038 A1 | 4/2018 | Green |
| 2021/0053647 A1* | 2/2021 | Wang ................ B62K 5/007 |
| 2022/0274667 A1 | 9/2022 | Ma |
| 2023/0344074 A1* | 10/2023 | Vandemark ......... H01M 50/342 |

International Search Report and Written Opinion dated Jul. 9, 2024, directed to International Application No. PCT/US2024/025491; 11 pages.

* cited by examiner

BALANCE ASSISTANCE AND FIREPROOFING DEVICE FOR SCOOTERS

CROSS-REFERENCE TO RELATED APPLICATIONS

This application claims the benefit of U.S. Provisional Application No. 63/577,402, filed Apr. 21, 2023, the disclosure of which is incorporated herein by reference in its entirety.

FIELD OF THE DISCLOSURE

This disclosure relates generally to scooters, and more specifically, to a balance assistance and fireproofing device compatible with scooters.

BACKGROUND OF THE DISCLOSURE

Personal scooters, such as electric scooters, are commonly used for local transportation. Current self-balancing electric scooter designs typically include a standing platform for a user, two in-line wheels beneath the standing platform, motors and batteries to drive the wheels, and handlebars to control the front wheel. One of the problems with two-wheeled, self-balancing scooters, both non-electric and electric, is that they can be difficult to ride and/or stand on without falling, especially for elderly, disabled, or untrained individuals. Even with proper guidance and training, the use of scooters can feel quite unstable and difficult to use, and may result in injury or even death to the user. When operating a scooter, users typically stand on the standing platform with one foot in front and another foot behind, or suspended in the air, due to the limited surface area of the standing platform. Due to the design of the scooter and the standing position of the user, many users may find it difficult to balance on scooters without tipping over and/or falling. This increases the risk of injury for the user.

Furthermore, another problem with current electric scooter designs is that the batteries are prone to combustion. The batteries typically are lithium-based or nickel-based batteries that may occasionally combust or generate smoke, especially while charging or during operation of the electric scooters. This increases the risk of injury to the user and fire damage to the surroundings of the electric scooters. Instead of returning and/or retiring the electric scooters, which may be wasteful and/or expensive, users may wish to modify existing electric scooters to mitigate the risk of injury and fire damage.

SUMMARY OF THE DISCLOSURE

As stated above, current electric scooters fail to implement balancing and fireproofing features, and, as a result, users of such electric scooters may experience increased risk of injury and fire damage. Furthermore, the users may wish to modify existing electric scooters to implement these features to reduce waste and expenses. Thus, Applicant discovered an improved accessory for a scooter, that can provide users with balancing and fireproofing features and can be retrofittable onto existing scooters. As described in examples herein, a balance assistance and fireproofing device for scooters can provide these improvements. The balance assistance and fireproofing device can be attached or clipped onto existing scooters, providing balance improvements via one or more training wheels and providing fireproofing improvements via one or more units containing fire-suppressant materials. Thus, the balance assistance and fireproofing device can improve the safety of users in an easy-to-install, adjustable, and/or inexpensive manner. Accordingly, disclosed herein are devices that may address some of the above-identified needs.

In some embodiments, a balance assistance and fireproofing device may be attached to the center of an electric scooter's standing platform, to improve the stability of the scooter and to provide fireproofing to the batteries. The attachment can include two training wheels, each positioned to an opposite side of the standing platform, to provide the vehicle with stability. The training wheels may be connected to an axle that is mounted to a fireproofing unit. The fireproofing unit, which contains fire-suppressant materials, can clamp to the standing platform, which contains at least a portion of the batteries. Users can easily adjust, reposition, and/or remove portions of the balance assistance and fireproofing device. For example, after improving their expertise in balancing and riding the scooter, the users can remove the training wheels, while leaving the fireproofing unit in place. Alternatively, in another example, users can remove the entire balance assistance and fireproofing device from one scooter and attach it to another scooter. In some embodiments, the training wheels can be adjusted and/or replaced in order to mount the balance assistance and fireproofing device to different scooters. Moreover, each of the training wheels can adjust to the base dimensions of the scooter in regards to the length and depth of the standing platform. In some embodiments, the distance between the training wheels and the support platform of the scooter can also be adjusted. The case of adjustability and safety features are among some of the advantages of the balance assistance and fireproofing devices disclosed herein.

According to some embodiments, an exemplary device configured to be attached to a scooter comprises: a top layer attached to a bottom layer such that the top and bottom layers surround at least a portion of a standing platform of the scooter when attached to the scooter, wherein the top layer and/or bottom layer comprise a fire-suppressant material; a rod attached to the top or bottom layer; and two wheels attached to the rod such that the two wheels are situated on opposite sides of the attached top and bottom layers.

In some embodiments, the top layer comprises one or more grooves that engage with one or more corresponding protrusions of the bottom layer when the top layer is attached to the bottom layer. In some embodiments, the top layer and the bottom layer are configured to slide together such that the one or more grooves of the top layer engage with the one or more protrusions of the bottom layer to surround at least a portion of the standing platform of the scooter.

In some embodiments, the top layer comprises one or more protrusions that engage with one or more corresponding grooves of the bottom layer when the top layer is attached to the bottom layer. In some embodiments, the top layer and/or bottom layer comprises a groove configured to receive the standing platform.

In some embodiments, the top layer and/or bottom layer comprises a storage chamber.

In some embodiments, the fire-suppressant material comprises a fireproof sealant comprising one or more of: caulk, foam, silicone, and putty.

In some embodiments, the top or bottom layer comprises one or more brackets and the rod is attached to the one or more brackets. In some embodiments, the rod is attached to a bottom surface of the bottom layer.

In some embodiments, the top layer and/or bottom layer extends laterally outward from the standing platform of the scooter when attached to the scooter.

In some embodiments, the standing platform comprises a battery and at least a portion of the standing platform comprising the battery is surrounded by the top and bottom layers.

According to some embodiments, an exemplary scooter system comprises: a scooter comprising a standing platform and a battery at least partially embedded within the standing platform; and a device configured to be attached to the scooter, the device comprising: a top layer attached to a bottom layer such that the top and bottom layers surround at least a portion of the standing platform of the scooter when attached to the scooter, wherein the top layer and/or bottom layer comprise a fire-suppressant material; a rod attached to the top or bottom layer; and two wheels attached to the rod such that the two wheels are situated on opposite sides of the attached top and bottom layers.

It will be appreciated that any of the variations, aspects, features and options described in view of the systems can be combined.

Additional advantages will be readily apparent to those skilled in the art from the following detailed description. The aspects and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

Exemplary embodiments are described with reference to the accompanying figures, in which.

DETAILED DESCRIPTION OF THE DISCLOSURE

Disclosed herein are exemplary scooter accessories that provide balance assistance and fireproofing to scooters. The balance assistance and fireproofing devices described herein can be attached or clipped onto existing scooters, providing balance improvements via one or more training wheels and providing fireproofing improvements via one or more units containing fire-suppressant materials. In some embodiments, a balance assistance and fireproofing device may be attached to the center of a scooter's standing platform, to improve the stability of the scooter and to provide fireproofing to the batteries. The attachment can include two training wheels, each positioned to an opposite side of the standing platform, to provide the vehicle with stability. The training wheels may be connected to an axle that is mounted to a fireproofing unit. The fireproofing unit, which contains fire-suppressant materials, can attach or clamp to the standing platform, which contains at least a portion of the batteries. Users can easily adjust, reposition, and/or remove portions of the balance assistance and fireproofing device.

As described above, current scooters fail to implement balancing and/or fireproofing features, and, as a result, users of such scooters may experience increased risk of injury and fire damage. For example, conventional two-wheeled, self-balancing scooters can be difficult to ride and/or stand on without falling, especially for elderly, disabled, or untrained individuals, and the batteries of such conventional scooters may be prone to combustion. Conversely, the devices described herein can provide users with balancing and fireproofing features and are retrofittable onto existing scooters. In some embodiments, a balance assistance and fireproofing device can be clipped onto existing scooters, providing balance improvements via one or more training wheels and providing fireproofing improvements via one or more units containing fire-suppressant materials. Thus, the balance assistance and fireproofing device can improve the safety of users in an easy-to-install, adjustable, and/or inexpensive manner.

Reference will now be made in detail to implementations and embodiments of various aspects and variations of systems, devices, and methods described herein. Although several exemplary variations of the systems, devices, and methods are described herein, other variations of the systems, devices, and methods may include aspects of the systems, devices, and methods described herein combined in any suitable manner having combinations of all or some of the aspects described. Disclosed herein are devices that may address one or more of the problems discussed above.

Figure 1A:
FIG. 1A depicts an overall view of an exemplary balance assistance and fireproofing device compatible with a scooter, in accordance with some embodiments disclosed herein.

FIG. 1A depicts an overall view of an exemplary balance assistance and fireproofing device 100 compatible with a scooter 198, in accordance with some embodiments. The scooter 198 can be any scooter on the market, such as a self-balancing scooter with two inline wheels. In some embodiments, the scooter 198 comprises a standing platform 199 for a user, two in-line wheels beneath the standing platform, motors and batteries to drive the wheels, and handlebars to control the front wheel. It is to be understood, however, that the scooter 198 can have additional configurations and is not limited to this combination of features.

The standing platform 199 for the user can include an approximately flat surface that provides a user with a place to stand during operation of the scooter 198. In some embodiments, the balance assistance and fireproofing device 100 is configured to attach to at least a portion of the standing platform 199 to provide balancing and fireproofing functionality to the scooter 198. The device 100 can attach to the standing platform 199 along any region or the entirety of the standing platform 199. For example, the device 100 can attach to a portion of the standing platform 199 near the rear in-line wheel of the scooter 198, near the front in-line wheel of the scooter 198, centered between the two in-line wheels of the scooter 198, or anywhere in-between. In some embodiments, the device 100 can attach to the entire length of the standing platform 199.

In some embodiments, the device 100 can include multiple components, including a fireproofing central unit comprising a top layer 104T and a bottom layer 104B, a clamp mechanism 106 for attaching the central unit to the scooter 198, a rod 108 attached to the central unit, and two wheels 102L and 102R attached to the rod 108. The device 100 is described in greater detail in the examples below.

Figure 1B:
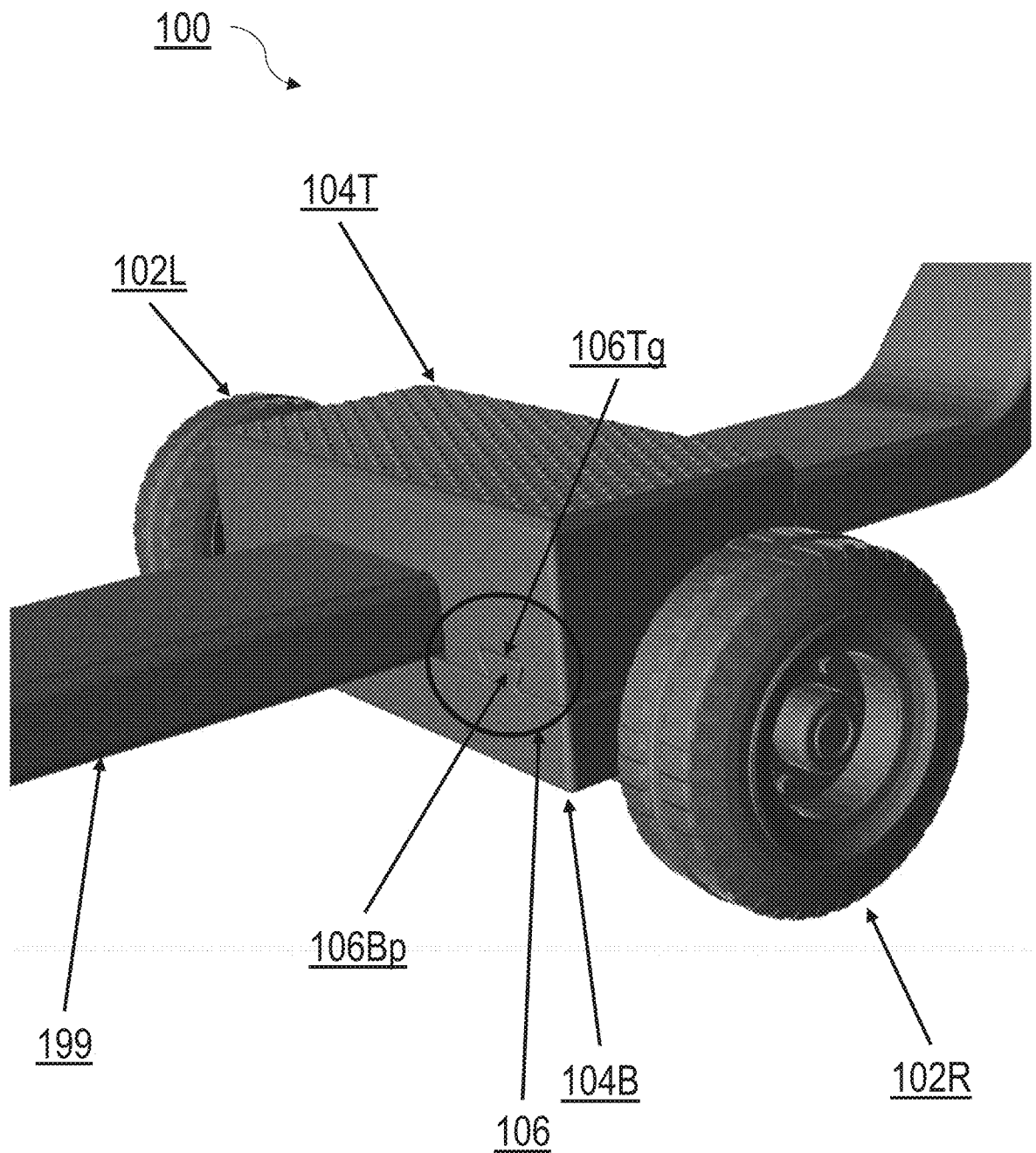
FIG. 1B depicts an upper perspective view of an exemplary balance assistance and fireproofing device compatible with a scooter, in accordance with some embodiments disclosed herein.

FIG. 1B depicts an upper perspective view of an exemplary balance assistance and fireproofing device 100 compatible with a scooter 198, in accordance with some embodiments. In some embodiments, the device 100 can include a fireproofing central unit comprising a top layer 104T and a bottom layer 104B. The central unit can include a clamp mechanism 106 for removably attaching the central unit to the scooter deck 199 of the scooter 198. Beneath the standing platform 199, a rod 108 (not pictured) runs underneath and is connected to the bottom layer 104B of the central unit. The rod 108 can serve as an axle that is connected to two wheels, a left wheel 102L and a right wheel 102R. Taken together, these components of the device 100 can provide balance assistance and fireproofing functionalities when attached to the scooter 198.

In some embodiments, the training wheels 102L and 102R can be any tire, wheel, roller, and/or similar component. Each wheel can be situated on a diametrically opposite side of the scooter 198 from the other wheel (e.g., left or right). During operation of a scooter 198 with the device 100 attached, the training wheels 102L and 102R can be configured to make contact with the ground at least part of the time. The training wheels 102L and 102R can prevent the scooter 198 from tipping over to the left and/or right, thereby providing balance assistance to the user while operating the scooter 198. For example, if the user leans left, the training wheel 102L may make contact with the ground, preventing the scooter 198 from tipping further left. In some embodiments, the training wheels 102L and 102R may be the same size as the wheels of the scooter 198. It is to be understood, however, that the training wheels 102L and 102R can be of any size, width, diameter, and/or form factor. In some embodiments, the distance between the training wheels 102L and 102R and the sides of the standing platform 199 can be adjustable. In some embodiments, the training wheels 102L and 102R can be removed from the device 100. In such embodiments, the device 100 may operate without the balance assistance features and may instead function as a fireproofing device.

Figure 1C:
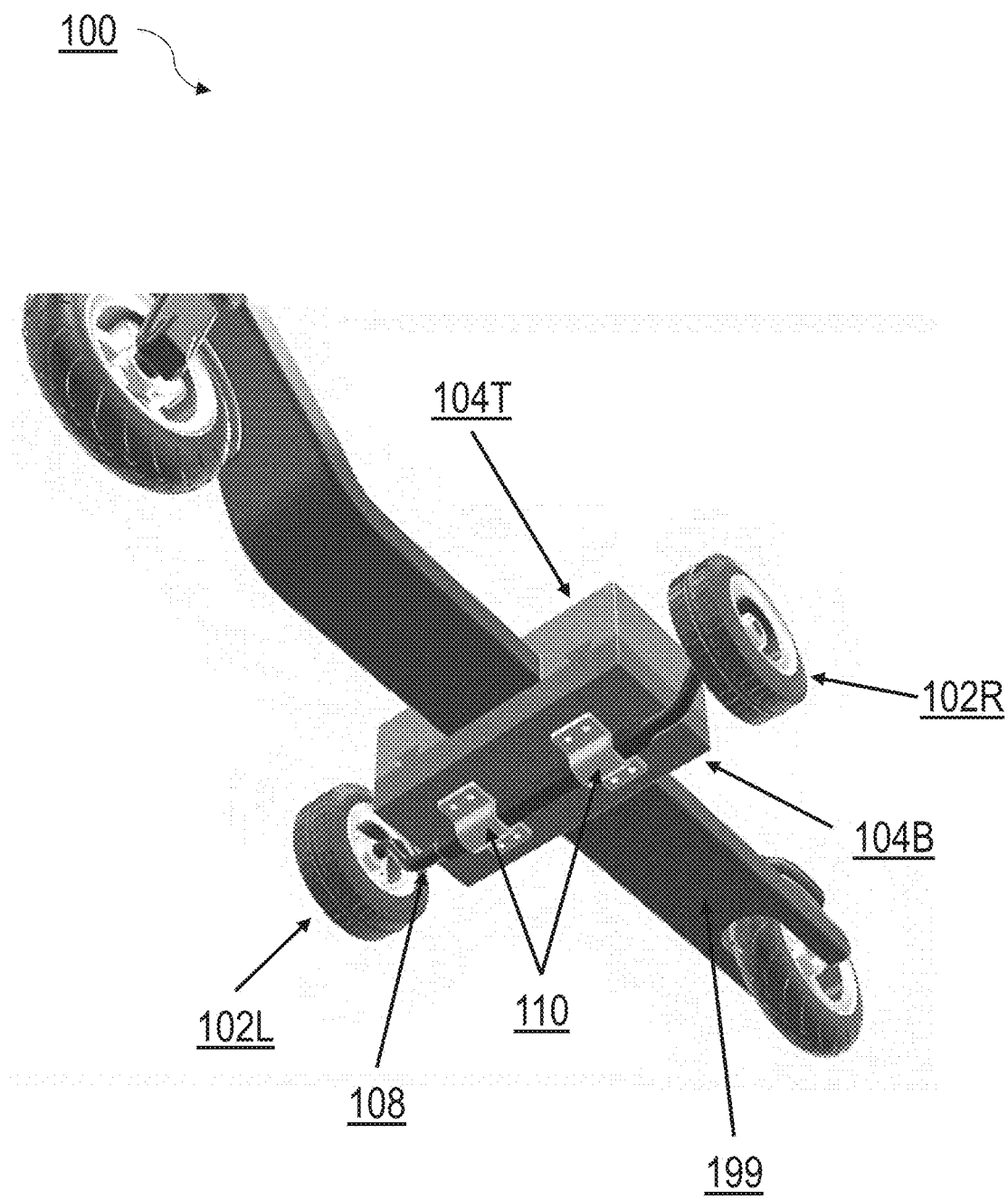
FIG. 1C depicts a lower perspective view of an exemplary balance assistance and fireproofing device compatible with a scooter, in accordance with some embodiments disclosed herein.
Figure 2A:
FIG. 2A depicts an exemplary wheel of a balance assistance and fireproofing device, in accordance with some embodiments disclosed herein.
Figure 2B:
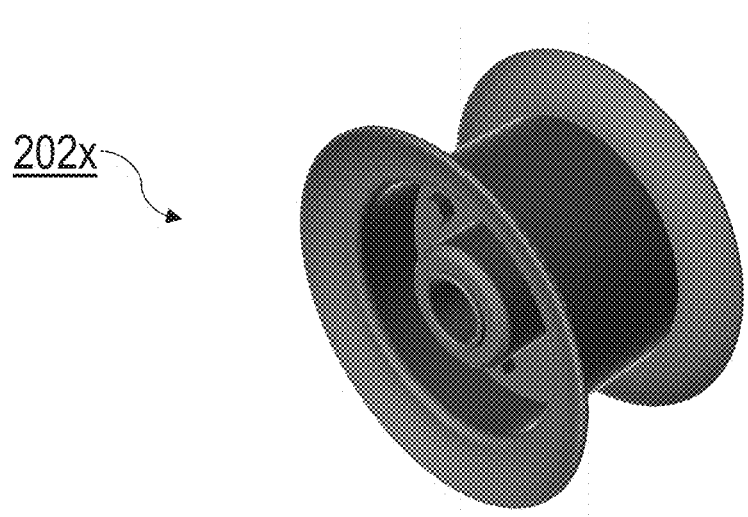
FIG. 2B depicts an exemplary wheel rim of a balance assistance and fireproofing device, in accordance with some embodiments disclosed herein.

FIG. 2A depicts a close-up view of an exemplary wheel 202 of a balance assistance and fireproofing device (e.g., device 100 of FIG. 1), in accordance with some embodiments. The outer portion of the wheel 200 may be any shock-absorption wheel, such as a rubber wheel. FIG. 2B depicts a close-up view of an exemplary wheel rim 202x of the wheel 200. The inner portion of the wheel 200 can include any wheel rim 202x compatible with the outer portion of the wheel 200. The wheel rim 202x can connect the wheel 202 to the axle (e.g., rod 108 of FIG. 1). The wheel 202 can share any characteristics of the training wheels 102L and 102R of FIG. 1, and vice versa.

Referring back to FIG. 1B, in some embodiments, the fireproofing central unit can be a structure consisting at least partially of a fire-suppressant material (e.g., a fireproof sealant comprising one or more of: caulk, foam, silicone, and putty). The fire-suppressant materials can line at least a portion of the interior of the central unit. In some embodiments, the fire-suppressant materials can coat at least a portion of the exterior of the central unit.

In some embodiments, the central unit can be a box-like structure that removably attaches to, surrounds, and/or encloses at least a portion of the standing platform 199. The central unit can comprise a top layer 104T and a bottom layer 104B which can be connected by a clamp mechanism 106. The top layer 104T and bottom layer 104B, when clamped together around the standing platform 199, can enclose a battery embedded at least partially within the standing platform 199. This can enable the central unit, which contains fire-suppressant materials, to prevent battery fires from damaging the user and/or the surroundings of the scooter 198. In some embodiments, the top layer 104T and bottom layer 104B, when clamped together around the standing platform 199, can enclose and/or surround at least a portion of the top, bottom, left, and right sides of the standing platform 199. In some embodiments, the top surface of the bottom layer 104B can engage with and/or attach to the bottom surface of the top layer 104T.

In some embodiments, the top layer 104T can comprise a solid surface upon which the user can stand. In some embodiments, the top layer 104T can contain fire-suppressant materials. As shown in FIG. 1B, the surface of the top layer 104T may be textured to provide a user with improved traction and grip relative to a smooth surface. The top layer 104T can be positioned over a top surface of the standing platform 199. In some embodiments, the bottom surface of the top layer 104T can attach to the top surface of the bottom layer 104B. For example, the top layer 104T can attach to the bottom layer 104B such that the layers surround at least a portion of a standing platform 199 of the scooter 198 when attached to the scooter 198.

In some embodiments, a surface of the top layer 104T may be elevated above the surface of the standing platform 199. In some such embodiments, the top layer 104T can extend vertically upward from the standing platform 199 when attached to the scooter 198. In some embodiments, the top layer 104T of the central unit extends laterally (also referred to herein as "horizontally") outward from the standing platform 199 when attached to the scooter 198. This can provide a larger surface upon which the user can stand. In some embodiments, a user can place both feet side-by-side on the surface of the top layer 104T. Standing with feet side-by-side can improve user comfort and improve the user's balance, relative to standing with one foot in front of the other on the standing platform 199.

Figure 3A:
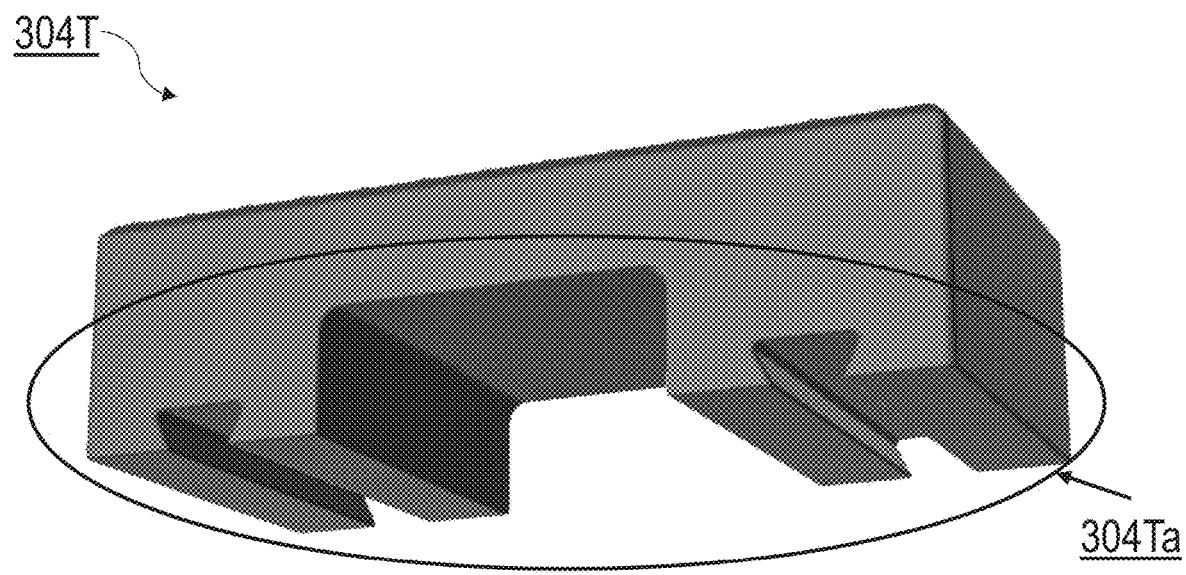
FIG. 3A depicts a bottom perspective view of an exemplary top layer of a fireproofing central unit of a balance assistance and fireproofing device, in accordance with some embodiments disclosed herein.
Figure 3B:
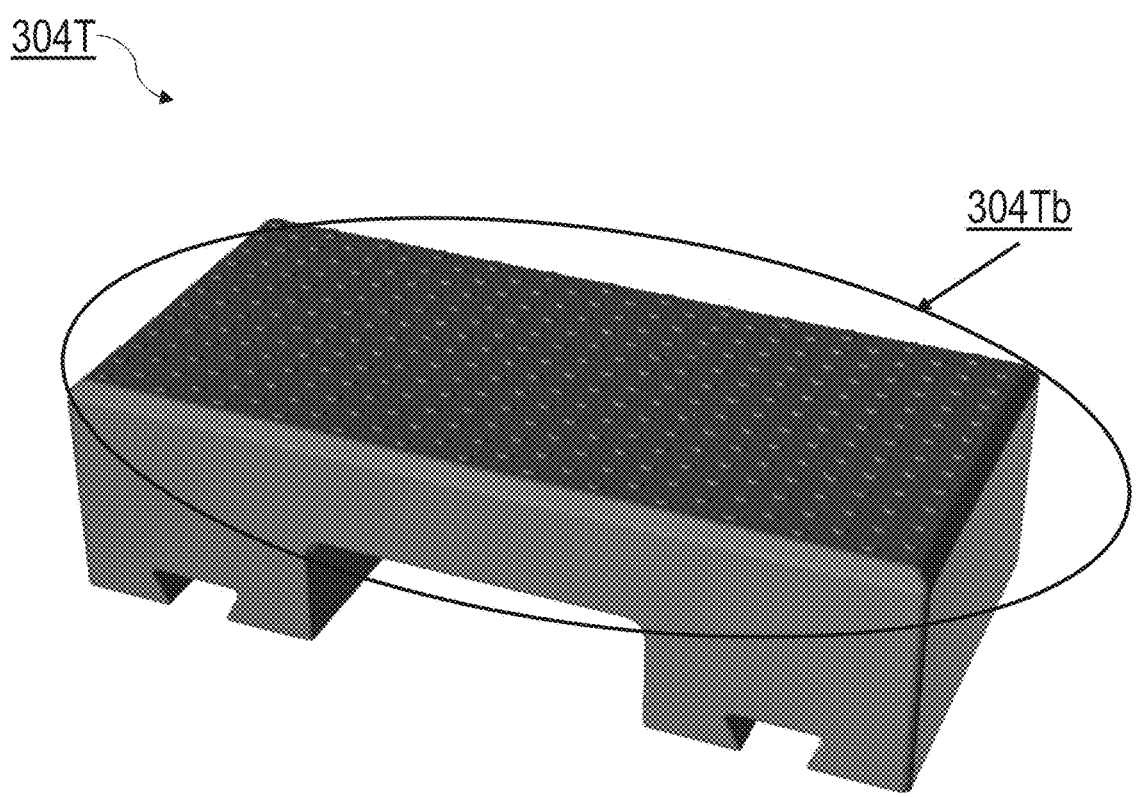
FIG. 3B depicts a top perspective view of an exemplary top layer of a fireproofing central unit of a balance assistance and fireproofing device, in accordance with some embodiments disclosed herein.

FIGS. 3A and 3B depict close-up views of an exemplary top layer 304T of a central fireproofing unit of a balance assistance and fireproofing device (e.g., device 100 of FIG. 1), in accordance with some embodiments. In some embodiments, the top layer 304T can include one or more components for attaching the top layer 304T to a bottom layer (e.g., bottom layer 404B of FIG. 4). In some embodiments, the top layer 304T can include one or more components for receiving and/or attaching the top layer 304T to the standing platform of a scooter. The top layer 304T can share any characteristics of the top layer 104T of FIG. 1, and vice versa.

FIG. 3A depicts a bottom perspective view of the top layer 304T. Specifically, FIG. 3A illustrates a first surface 304Ta of the top layer 304T. As shown in FIG. 3A, the first surface 304Ta can be a bottom surface of the top layer 304T. However, it is to be understood that the first surface 304Ta can be any surface of the top layer 304T, such as a top surface or a side surface, and is not limited to what is illustrated in FIG. 3A.

Figure 4:
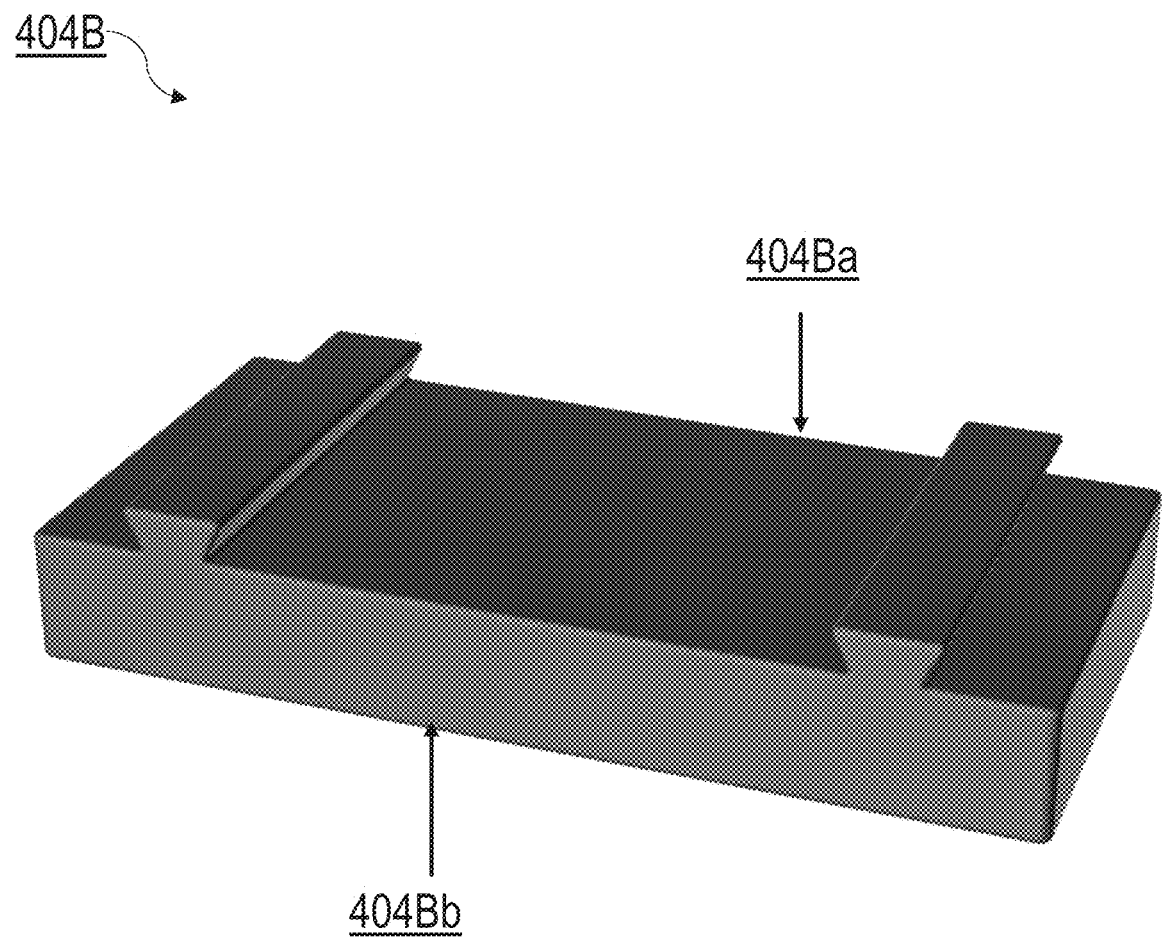
FIG. 4 depicts an exemplary bottom layer of a fireproofing central unit of a balance assistance and fireproofing device, in accordance with some embodiments disclosed herein.

In some embodiments, the top layer 304T can include one or more grooves and/or one or more protrusions that can engage with one or more corresponding protrusions and/or one or more grooves on a bottom layer (e.g., bottom layer 404B of FIG. 4). For example, in some embodiments, the first surface 304Ta includes one or more grooves that engage with one or more corresponding protrusions of the bottom layer when the top layer 304T is attached to the bottom layer. In some embodiments, the first surface 304Ta includes one or more protrusions that engage with one or more corresponding grooves of the bottom layer when the top layer 304T is attached to the bottom layer.

In some embodiments, a groove can be any physical indentation, furrow, channel, or receptacle on the surface of an object. In some embodiments, a groove on the top layer 304T can be an indentation that runs at least partially along any dimension (length, width, depth) of the top layer 304T. For example, as shown in FIG. 3A, the grooves of the top layer 304T can run fully along one dimension of the first surface 304Ta of the top layer 304T. The grooves can have any shape and/or cross-section. For example, the groove can have a circular, triangular, rectangular, trapezoidal, saw-tooth, or frustrum-shaped cross-section. Further, each groove can vary in size and/or shape throughout the length of the groove.

In some embodiments, a protrusion can be any physical projection, ridge, or extrusion on the surface of an object. In some embodiments, a protrusion on the top layer 304T can be a ridge that runs at least partially along any dimension (length, width, depth) of the top layer 304T. In some embodiments, the protrusions of the top layer 304T can run fully along one dimension of the first surface 304Ta of the top layer 304T.

In some embodiments, a groove can be configured to receive a corresponding protrusion, and a protrusion can be configured to engage with a corresponding groove. The shapes of the protrusion and groove can be chosen to enable at least a portion of the groove and at least a portion of the protrusion to be positioned flush against one another. In some embodiments, the shapes of the protrusion and groove can be inverse shapes. For example, both the protrusion and the groove can have a square cross-section of approximately equal dimensions.

In some embodiments, a groove can be configured to receive the standing platform of the scooter. The shape of the groove can be chosen to enable at least a portion of the groove and at least a portion of the standing platform to be positioned flush against one another. For example, the groove can be chosen to match the dimensions of the standing platform such that, when the top layer 304Ta is placed on top of the standing platform, the groove is positioned flush against the top of the standing platform. In some embodiments, the groove can be configured to engage with the standing platform to reduce and/or eliminate the unintentional movement and/or slipping of the top layer 304T against the standing platform. In some embodiments, the groove can include a friction-based anti-slip mechanism, such as Velcro or nonslip padding, to engage with the standing platform. In some embodiments, the groove can include a buckle, lock, strap, latch, or other connective mechanism configured to engage with the standing platform.

FIG. 3B depicts a top perspective view the top layer 304T. Specifically, FIG. 3B illustrates a second surface 304Tb of the top layer 304T. As shown in FIG. 3B, the second surface 304Tb can be a top surface of the top layer 304T. However, it is to be understood that the second surface 304Tb can be any surface of the top layer 304T, such as a bottom surface or a side surface, and is not limited to what is illustrated in FIG. 3B. In some embodiments, at least a portion of the second surface 304Tb can include a non-slip coating, material, and/or texture. The second surface 304Tb can be configured to provide a user with a solid surface upon which to stand when operating the scooter.

In some embodiments, the top layer 304T can be at least partially hollow. In some embodiments, the top layer 304T can contain a hollow storage container for storing items. The storage container can be a lockable compartment secured within the hollow regions of the top layer 304T.

Referring back to FIG. 1B, in some embodiments, the bottom layer 104B can comprise a structure containing fire-suppressant materials. The bottom layer 104B can be positioned over a bottom surface of the standing platform 199. In some embodiments, the top surface of the bottom layer 104B can attach to the bottom surface of the top layer 104T. In some embodiments, a rod 108 can attach to the central unit via one or more fixed points on a bottom surface of the bottom layer 104B.

In some embodiments, the bottom layer 104B can be at least partially hollow. In some embodiments, the bottom layer 104B can contain a hollow storage container for storing items. The storage container can be a lockable compartment secured within the hollow regions of the bottom layer 104B.

FIG. 4 depicts a close-up view of an exemplary bottom layer 404B of a central fireproofing unit of a balance assistance and fireproofing device (e.g., device 100 of FIG. 1), in accordance with some embodiments. In some embodiments, the bottom layer 404B can include one or more components for attaching the bottom layer 404B to a top layer (e.g., top layer 304T of FIGS. 3A and 3B). For example, the bottom layer 404B can include one or more grooves and/or one or more protrusions that can engage with one or more corresponding protrusions and/or one or more grooves on a top layer. The bottom layer 404B can share any characteristics of the bottom layer 104B of FIG. 1, and vice versa.

In some embodiments, the bottom layer 404B includes a first surface 404Ba. As shown in FIG. 4, the first surface 404Ba can be a top surface of the bottom layer 404B. However, it is to be understood that the first surface 404Ba can be any surface of the bottom layer 404B, such as a bottom surface or a side surface, and is not limited to what is illustrated in FIG. 4.

In some embodiments, the bottom layer 404B can include one or more grooves and/or one or more protrusions that can engage with one or more corresponding protrusions and/or one or more grooves on a bottom layer (e.g., top layer 304T of FIGS. 3A and 3B). For example, in some embodiments, the first surface 404Ba includes one or more grooves that engage with one or more corresponding protrusions of the bottom layer when the bottom layer 404B is attached to the top layer. In some embodiments, the first surface 404Ba includes one or more protrusions that engage with one or more corresponding grooves of the bottom layer when the bottom layer 404B is attached to the top layer. The grooves and protrusions of the bottom layer 404B can share any characteristics of the grooves and protrusions of FIGS. 3A and 3B, and vice versa.

In some embodiments, the bottom layer 404B includes a second surface 404Bb. As shown in FIG. 4, the second surface 404Bb can be a bottom surface of the bottom layer 404B. However, it is to be understood that the second surface 404Bb can be any surface of the bottom layer 404B, such as a top surface or a side surface, and is not limited to what is illustrated in FIG. 4. In some embodiments (not pictured), the second surface 404Bb can include one or more attachment points and/or fixed points for attaching a rod (e.g., rod 108 of FIG. 1) to the bottom layer 404B.

Referring back to FIG. 1B, in some embodiments, at least one clamp mechanism 106 can hold the top layer 104T and bottom layer 104T together around the standing platform 199. The clamp mechanism 106 can function as a means for attaching the central unit to the standing platform 199, and by extension, the scooter 198. The clamp mechanism 106 can be affixed to the central unit and situated between the top layer 104T and the bottom layer 104B of the central unit. In some embodiments, the clamp mechanism 106 comprises a top segment (e.g., attached to top layer 104T) and a bottom segment (e.g., attached to bottom layer 104B). The segments can be positioned on diametrically opposite sides of the standing platform 199 (e.g., top and bottom sides). The top segment and the bottom segment can be engageable with one another to define the clamp mechanism 106.

In some embodiments, the clamp mechanism 106 can comprise a groove-and-protrusion attachment. The grooves and protrusions of the clamp mechanism 106 can have any characteristics of the grooves and protrusions described in FIGS. 3A, 3B, and 4, and vice versa.

As shown in FIG. 1B, the clamp mechanism 106 can comprise the grooves and protrusions along the junction of the top layer 104T and bottom layer 104B. The grooves and protrusions can form zig-zagging surfaces along at least a portion of the top layer 104T and at least a portion of the bottom layer 104B. The grooves may be configured to receive the protrusions (e.g., the shape of the grooves and protrusions are inverse) and to lock the protrusions in place. The width of the grooves and protrusions may be variable to enable such locking. In some embodiments, a groove 106Tg on the top layer 104T can engage with a protrusion 106Bp on the bottom layer 104B. The groove 106Tg on the top layer 104T comprises the top segment of the clamp mechanism 106, and the protrusion 106Bp on the bottom layer 104B comprises the bottom segment of the clamp mechanism 106. By slotting and/or sliding the protrusion 106Bp into the groove 106Tg, the clamp mechanism 106 can hold the top layer 104T and the bottom layer 104B together around the standing platform 199. For example, the top layer 104T can be placed on a top side of the standing platform 199 such that the groove 106Tg is on a bottom-facing surface of the top layer 104T. The bottom layer 104B can be placed on a bottom side of the standing platform 199 such that the protrusion 106Bp is on a top-facing surface of the bottom layer 104B. The top layer 104T and bottom layer 104B can slide laterally toward one another such that they are flush with one another. The protrusion 106Bp can slide into the groove 106Tg, such that the top layer 104T and bottom layer 104B cannot be separated by vertical forces (e.g., gravity). The union of the groove 106Tg and protrusion 106Bp can thus hold the top layer 104T and bottom layer 104B together around and/or surrounding the standing platform 199.

Figure 5:
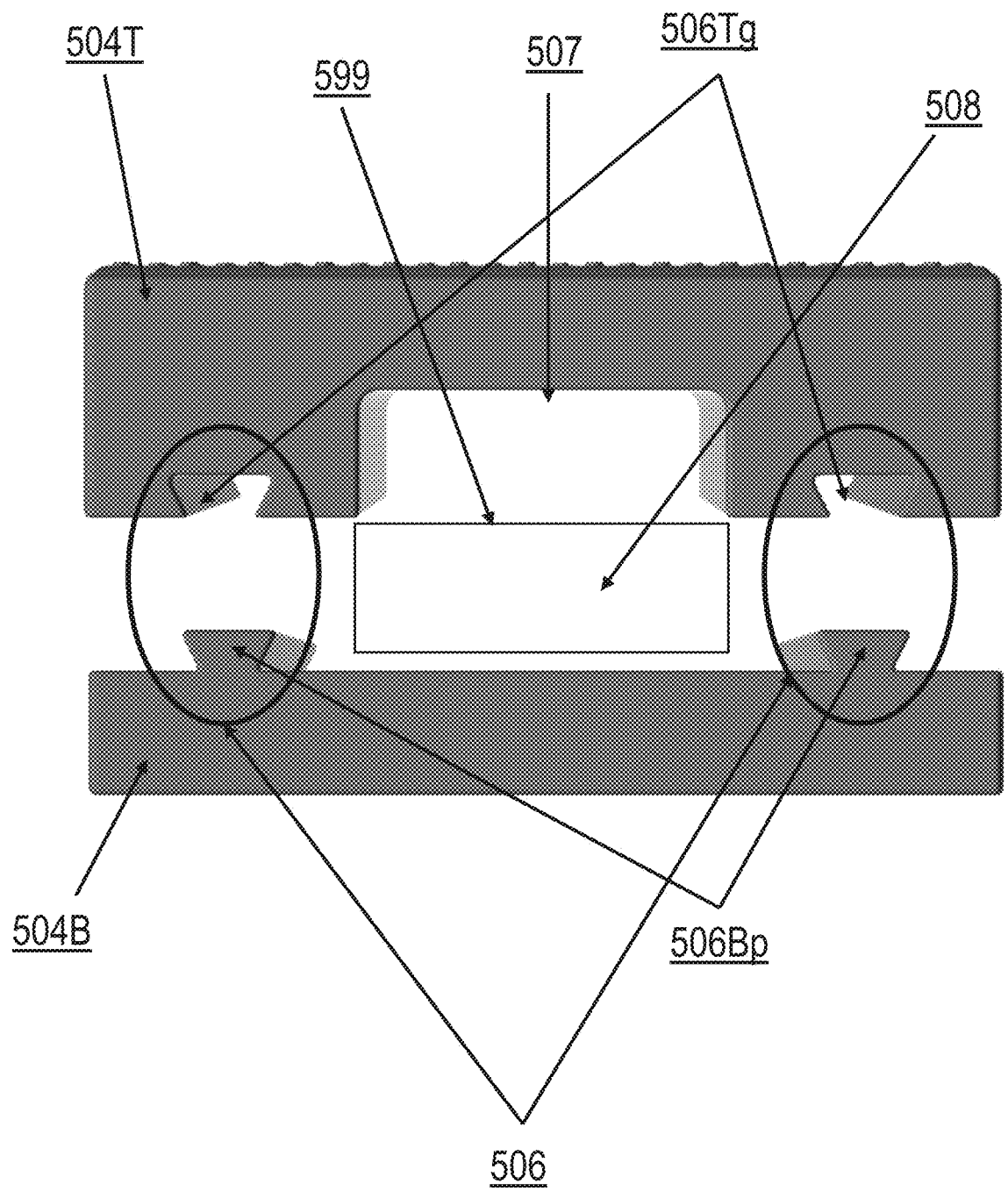
FIG. 5 depicts exemplary grooves and protrusions of a fireproofing central unit of a balance assistance and fireproofing device, in accordance with some embodiments disclosed herein.

In some embodiments, the device 100 can include multiple clamp mechanisms 106. For example, FIG. 5 illustrates an exemplary fireproofing central unit comprising two clamp mechanisms 506. The top layer 504T contains two grooves 506Tg, and the bottom layer 504B contains two protrusions 506Bp. The grooves and protrusions are located on either side (e.g., left and right) of a standing platform 599. The top layer 504T and bottom layer 504B can slide laterally toward one another such that they are flush with one another. The protrusions 506Bp can slide into the grooves 506Tg, such that the top layer 504T and bottom layer 504B cannot be separated by vertical forces (e.g., gravity). The union of the multiple grooves 506Tg and multiple protrusions 506Bp can thus hold the top layer 504T and bottom layer 504B together around the standing platform 599.

In some embodiments, a groove 507 adjacent to the clamp mechanism 106 can be engageable with a portion of the standing platform 199 of the scooter 198. Engaging with the standing platform can include being removably affixed to a portion of the standing platform 199 such that the clamp mechanism 106, and by extension the device 100, does not slide back and forth along the standing platform 199 while the scooter 198 is in operation. The groove 507 can engage with the portion of the standing platform 199 enclosing at least a portion of a battery 508 at least partially embedded within the standing platform 199. This can position the fireproofing central unit around the battery 508, containing it and preventing potential battery fires from spreading to the user or the surroundings of the scooter. It is to be understood that, although the groove 507 is illustrated as being on the top layer 504T in FIG. 5, the groove 507 can be on any layer, including the bottom layer 504B. In some embodiments, both the top layer 504T and the bottom layer 504B can include a groove 507 for engaging with the standing platform 199. The groove 507 can have any characteristics of the grooves and protrusions described in FIGS. 3A, 3B, and 4, and vice versa.

Referring back to FIG. 1B, the clamp mechanism 106 of FIG. 1 can share any characteristics of the clamp mechanisms 506 of FIG. 5, and vice versa.

In some embodiments (not pictured), the clamp mechanism 106 can comprise a loop style attachment. The loop style attachment can include an adjustment mechanism connected to a top layer 104T of the central unit and an attachment rod extending from the adjustment mechanism. In some embodiments, the attachment rod can loop around the bottom layer 104B and standing platform 199 such that, when the attachment rod is tightened, the attachment rod can hold the top layer 104T and bottom layer 104B together around standing platform 199. The attachment rod can have a fixed end configured to attach to the top layer 104T and a free end configured to fit under the standing platform 199 of the scooter 198 and to re-engage with the adjustment mechanism. When the free end of the attachment rod is re-engaged with the adjustment mechanism, the clamp mechanism 106 can form a loop. The loop can be adjustably tightened and/or loosened. In some embodiments, the clamp mechanism 106 can be adjustable such that the loop is between about two inches in diameter and about five inches in diameter along one dimension. In some embodiments, the adjustment mechanism can have at least one tightening screw configured to selectively rotate in order to advance or retract the free end of the attachment rod through a portion of the adjustment mechanism. The selective rotation of the at least one tightening screw can adjust the overall diameter of the loop formed by the attachment rod in order to tighten or loosen the at least one clamp mechanism when the at least one clamp mechanism is engaged with the portion of the standing platform 199.

In some embodiments (not pictured), the clamp mechanism 106 can comprise a buckle attachment. A buckle can comprise a buckle head and a buckle receiver configured to receive the buckle head and lock it in place. A buckle head can connect to the top layer 104T, and a corresponding buckle receiver can connect to the bottom layer 104B. This configuration can be reversed such that, for example, a buckle receiver can connect to the top layer 104T, and a corresponding buckle head can connect to the bottom layer 104B. In some embodiments, the buckle can be vertically oriented such that the buckle head points into the buckle receiver. The buckle can enable the top layer 104T and bottom layer 104B to be attached to one another via vertical movement. In some embodiments, when the buckle is in a buckled position (e.g., the buckle head is locked in place within the buckle receiver), the top layer 104T and bottom layer 104B may be secured flush against one another. In some embodiments, the buckle can be unbuckled (e.g., the buckle head is not within the buckle receiver), and the top layer 104T and the bottom layer 104B can be separated.

In some embodiments (not pictured), the clamp mechanism 106 can comprise a hinged attachment. A hinge can connect to a first side of the top layer 104T and a first side of the bottom layer 104B. The hinge can enable the top layer 104T and bottom layer 104B to be selectively angled away from or toward one another. In some embodiments, when the hinge is in a closed position, the top layer 104T and bottom layer 104B may be positioned parallel to and flush against one another. In some embodiments, the hinge can open such that a portion of the top layer 104T and a portion of the bottom layer 104B move/angle away from one another, creating room for the top layer 104T and bottom layer 104B to be placed around a standing platform 199. Once the device 100 is positioned in the desired location, the hinge can close such that a portion of the top layer 104T and a portion of the bottom layer 104B are flush against one another again. This closes the top layer 104T and bottom layer 104B together around the standing platform 199. In some embodiments, the hinged attachment can be used in conjunction with the buckle attachment to secure a second side of the top layer 104T and a second side of the bottom layer 104B together. The second sides may be different from the first sides. In some embodiments, when the buckle attachment is buckled, the hinge attachment may be prevented from opening. This can prevent the hinge attachment from unintentionally being opened during operation of the scooter 198.

FIG. 1C depicts a lower perspective view of an exemplary balance assistance and fireproofing device compatible with a scooter, in accordance with some embodiments. As shown in FIG. 1C, beneath the standing platform 199, a rod 108 runs underneath the central unit and is connected to two wheels. In some embodiments, the two wheels are attached to the rod such that the two wheels are situated on opposite sides of the top layer 104T and bottom layer 104B once attached. In some embodiments, the rod 108 is connected to the central unit via one or more brackets 110. In some embodiments, the rod 108 is connected to the bottom layer 104B and/or the top layer 104T of the central unit.

In some embodiments, the rod 108 can be any rod, axle, spindle, shaft, and/or similar component. In some embodiments, the rod 108 serves as an axle that is connected to two wheels, a left wheel 102L and a right wheel 102R. The wheels 102L and 102R can attach to the rod 108 using any wheel-axis attachment mechanism. The rod 108 can be a straight, linear rod that does not bend and/or twist along its length. However, in some embodiments, such as shown in FIG. 1C, the rod 108 can be a non-linear rod that bends and/or twists along its length. In some embodiments, the rod 108 can be a U-shaped rod. Depending on the size of the wheels relative to the distance between the rod 108 and the ground, the shape of the rod 108 can be adjusted. For example, the wheels 102L and 102R may be large such that the wheel centers are located above the bottom surface of the bottom layer 104B. In such cases, the rod 108 can be bent upward at the ends to provide a higher attachment point (relative to the ground) at the wheels 102L and 102R. The rod 108 can be bent downward at the center to provide a lower attachment point when attaching to the bottom layer 104B, which is lower (relative to the ground) than the center of the wheels 102L and 102R. The opposite direction of bending can occur for wheels which are small such that the wheel centers are located below the bottom surface of the bottom layer 104B.

In some embodiments, the rod 108 can be attached to the central unit at one or more fixed points. The fixed points can be locations on the bottom surface of the bottom layer 104B, allowing the rod 108 to run underneath the central unit without intersection with the standing platform 199. In some embodiments, the brackets 110 can be used to attach the rod 108 to the central unit at the one or more fixed points. The brackets 110 can include any suitable bracket, such as a U-shaped clamp or pipe clamp. In some embodiments, the brackets 110 can be removably attached to any portion of the central unit, such as the bottom layer 104B or top layer. In some embodiments, the rod can be fixed at least partially within the bottom layer 104B or top layer of the central unit, allowing the rod to run through the central unit without intersection with the standing platform 199.

Although FIG. 1C depicts the rod 108 as running underneath of the central unit and being connected to the bottom layer 104B, it is to be understood that the rod 108 is not limited to this configuration. In some embodiments, the rod 108 can be attached to any portion of top layer 104T and/or bottom layer 104B of the central unit.

Figure 6:
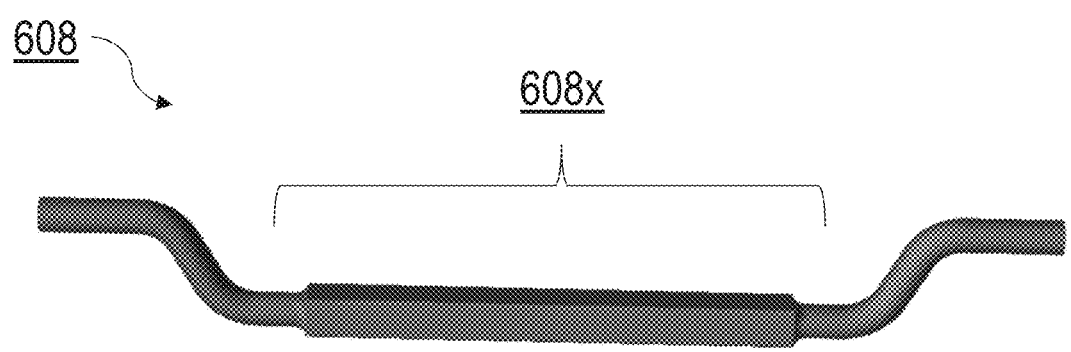
FIG. 6 depicts an exemplary axle of a balance assistance and fireproofing device, in accordance with some embodiments disclosed herein.

FIG. 6 depicts a close-up view of an exemplary rod 608 of a balance assistance and fireproofing device (e.g., device 100 of FIG. 1), in accordance with some embodiments. The rod 608 is a U-shaped rod that is configured to run along a surface (e.g., an underside) of the device. The rod 608 is configured to connect one or more wheels (e.g., wheels 102L and 102R of FIG. 1) to the central unit. In some embodiments, the ends of the rod 608 can rotate axially due to the movement of the rod 608, which can be undesirable due to its effect on moving the wheels up and down. To address this, the rod 608 can be fixed in place against the device so that it does not move and/or rotate axially. In some embodiments, such as shown in FIG. 6, at least a portion 608x of the rod 608 can have a non-circular cross-section. Having such a non-circular cross-section may prevent the rod 608 from rotating axially, keeping the orientation of the rod steady during operation of the scooter. For example, the cross-section of the portion 608x may be square or rectangular instead of circular. In some embodiments, the portion 608x may rest flush against the bottom layer (e.g., bottom layer 104B of FIG. 1) and the bracket (e.g., bracket 110 of FIG. 1), preventing the rod 608 from rotating axially. The rod 608 can share any characteristics of the rod 108 of FIG. 1, and vice versa.

Figure 7:
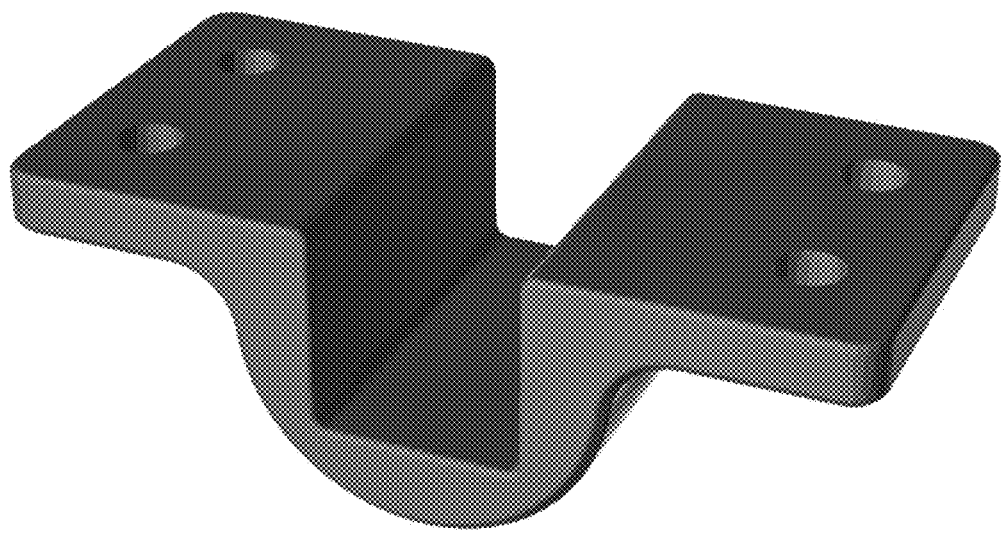
FIG. 7 depicts an exemplary bracket of a balance assistance and fireproofing device, in accordance with some embodiments disclosed herein.

FIG. 7 depicts a close-up view of a bracket 710 of a balance assistance and fireproofing device (e.g., device 100 of FIG. 1), in accordance with some embodiments. The bracket 710 may be configured to attach a rod to a central unit of the device. The bracket 710 may be compatible with the rod 108 of FIG. 1 and/or the rod 608 of FIG. 6. As shown in FIG. 7, the bracket 710 can be a U-shaped bracket with a groove for receiving a portion of the rod. The shape of the groove can mirror the shape of the rod such that, if the cross-section of a portion of the rod is non-circular, the bracket 710 can hold the rod stationary without allowing for axial rotation. For example, if the cross-section of the rod is square or rectangular, the sides of the groove can match the square shape of the rod, preventing the rod from rotating. In some embodiments, the bracket 710 can include one or more mechanisms for fasteners to connect the bracket 710 to the central unit. For example, the bracket 710 can include a plurality of through-holes through which a plurality of screws can extend. The screws can be tightened to hold the bracket 710 in place, attaching it to the central unit. The bracket 710 can share any characteristics of the bracket 110 of FIG. 1, and vice versa.

The examples provided above describe exemplary configurations in which the top layer 104T is a component that extends at least partly on top of the standing platform 199 and the bottom layer 104B is a component that extends at least partly underneath the standing platform 199. In such configurations, the top layer 104T is positioned above the bottom layer 104B when attached to the scooter 198. However, it is to be understood that the terms "top" and "bottom" are merely a means of nomenclature. The terms "top" and "bottom" indicate relative positioning and do not limit the top layer 104T to being oriented exclusively on top of the bottom layer 104B, and vice versa. In some embodiments, the top layer 104T and the bottom layer 104B may be designed such that the bottom layer 104B can be oriented on top of the top layer 104T, and vice versa. In some embodiments, the top layer 104T and the bottom layer 104B may be designed such that the layers can be oriented on the sides of the standing platform 199, and such that neither layer is above or below the other.

The examples provided above describe exemplary configurations in which the device 100 and scooter 198 are distinct components, and the device 100 can be removably attached to the scooter 198. In some embodiments, the device 100 can be integrated with the scooter 198 such that the device 100 is not removable from the scooter 198. In such embodiments, the device 100 can be considered to be a component of the scooter 198.

In some embodiments, the scooter 198 comprises a scooter with balance assistance and fireproofing functionalities. Similar to the configurations described previously herein, the scooter 198 can comprise a scooter body comprising a standing platform (e.g., standing platform 199) and a battery at least partially embedded within the standing platform. However, in this exemplary configuration, the scooter 198 can further include a balance assistance and fireproofing device 100 configured to be attached to the scooter body. The device 100 can include a central unit. The central unit can be attached to at least a portion of the scooter body, such as the standing platform. In some embodiments, the central unit is connected to a portion of the standing platform enclosing the battery at least partially embedded within the standing platform.

In some embodiments, the central unit can comprise a top layer 104T and a bottom layer 104B. The layers 104T and 104B may be configured to be fused together such that the device 100 is integrated into the scooter 198. For example, one or both of the layers 104T and 104B may be at least partially fused with the standing platform. In some embodiments, the central unit does not comprise distinct layers and can be integrally formed along with the scooter body. The central unit can share any features of the central units of the configurations described previously herein. For example, the central unit can comprise a fire-suppressant material, and/or the central unit can extend laterally outward from the standing platform.

The scooter 198 can further include a rod 108 attached to the central unit and two wheels 102L and 102R attached to the rod such that each wheel is situated on a diametrically opposite side of the standing platform from the other wheel (e.g., on the left and on the right side of the standing platform). The rod 108 and wheels 102L and 102R can share any features of their counterparts in the configurations described previously herein.

For the purpose of clarity and a concise description, features are described herein as part of the same or separate embodiments; however, it will be appreciated that the scope of the disclosure includes embodiments having combinations of all or some of the features described.

Additional Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Embodiments

Disclosed herein are exemplary embodiments for the balance assistance and fireproofing device. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims Embodiment 1. An electric scooter training wheel stability attachment for electric scooters having a main body forming a platform on which a rider stands, the main body having a top lateral end and a bottom lateral end disposed opposite the top lateral end and extending in a downward direction, the scooterizer training wheels further including two tires/wheels situated at the right and left lateral end of the rod, the stability attachment comprising: a frame having a top end and a bottom end disposed opposite, the frame being selectively mountable on the main body of the electric scooter and extends horizontally outwardly and generally transversely thereto when mounted thereon; at least both tires/wheels being situated on the rod connected to the stability attachment. the right wheel and the left wheel being situated on diametrically opposite sides of the stability attachment component which is connected to the electric scooter when the stability attachment is mounted thereon; and means for attaching the frame to the electric scooter.

Embodiment 2. A stability attachment for electric scooters as defined by embodiment 1, wherein the means for attaching the frame to the electric scooter comprises: at least one clamp mechanism affixed to the frame and situated between the top axial end and the bottom axial end of the frame, the at least one clamp mechanism being engageable with a portion of the stability attachment of the electric scooter to selectively mount the frame thereto.

Embodiment 3. A stability attachment for electric scooters as defined by embodiment 2, wherein the clamp mechanism is adjustment mechanism and an attachment rod extending therefrom, the attachment rods having a free end that may be fitted under the stability attachment of the electric scooter and engaged with the adjustment mechanism, the adjustment mechanism having at least one tightening screw that is selectively rotatable to advance and retract the free end of the attachment rod through the adjustment mechanism; and wherein the selective rotation of the tightening screw adjusts the overall diameter of the attachment rod to tighten or loosen the attachment clamp to the stability attachment of the electric scooter when the stability attachment is mounted thereon, Embodiment 4. A stability attachment for an electric scooter as defined by embodiment 3, wherein the clamp is adjustable between about two inches in diameter and about five inches in diameter.

Embodiment 5. A stability attachment for an electric scooter as defined by embodiment 2, wherein the clamp mechanism further comprises: the top segment and a bottom segment situated opposite the top segment, the top segment and the bottom segment being attachable to and being situatable on diametrically opposite sides of the stability attachment the electric scooter when the stability attachment is mounted thereon, each of the top segment and the bottom segment having a first end and a second end disposed opposite the first end; wherein the top segment and the bottom segment are engageable with one another define the clamp mechanism.

Embodiment 6. A device comprising in combination: an electric scooter having a main body forming a platform on which a rider stands, the main body having a top lateral end and a bottom lateral end disposed opposite the first lateral end and extending in a direction between, the electric scooter vehicle further including a right and left wheel situated at opposite ends of the stability attachment; and a stability attachment for mounting to electric scooters, the stability attachment including: a frame having a top end and a bottom end disposed opposite ends, the frame being selectively mountable on the main body of the electric scooter and extending horizontally outwardly therefrom and generally transversely thereto when mounted thereon; at least a right tire and a left tire, the right tire being situated on the rod in proximity to the left tire thereof, and the right tire and the left tire being situated on diametrically opposite sides of the rod stability attachment of the electric scooter.

Embodiment 7. A balance assistance and fireproofing device configured to be attached to an electric scooter, the device comprising: a central unit comprising a top layer and a bottom layer, wherein the central unit comprises a fire-suppressant material, and wherein the central unit is configured to extend horizontally outward from a standing platform of the electric scooter when attached to the electric scooter; at least one a clamp mechanism situated between the top layer and the bottom layer of the central unit; a rod attached to the central unit at one or more fixed points; and two wheels attached to the rod such that each wheel is situated on a diametrically opposite side of the electric scooter from the other wheel.

Embodiment 8. The device of embodiment 7, wherein the at least one clamp mechanism is engageable with a portion of the standing platform of the electric scooter.

Embodiment 9. The device of embodiment 7, wherein the at least one clamp mechanism engages with the portion of the standing platform enclosing at least a portion of a battery at least partially embedded within the standing platform.

Embodiment 10. The device of embodiment 7, wherein the at least one clamp mechanism comprises a top segment and a bottom segment configured to be positioned on diametrically opposite sides of the portion of the standing platform, wherein the top segment and the bottom segment are engageable with one another to define the at least one clamp mechanism.

Embodiment 11. The device of embodiment 10, wherein the top segment comprises a groove and/or protrusion on a top layer of the central unit and the bottom segment comprises a protrusion and/or groove on a bottom layer of the central unit.

Embodiment 12. The device of embodiment 10, wherein the top layer and the bottom layer are configured to slide horizontally together such that the groove and/or protrusion of the top segment engages with the protrusion and/or groove of the bottom segment to attach the central unit around a portion of the standing platform.

Embodiment 13. The device of embodiment 7, wherein the at least one clamp mechanism comprises an adjustment mechanism and an attachment rod extending from the adjustment mechanism, the attachment rod having a free end configured to fit under the standing platform of the electric scooter and to engage with the adjustment mechanism, and the adjustment mechanism having at least one tightening screw configured to selectively rotate in order to advance or retract the free end of the attachment rod through a portion of the adjustment mechanism.

Embodiment 14. The device of embodiment 13, wherein the selective rotation of the at least one tightening screw adjusts the overall diameter of the attachment rod in order to tighten or loosen the at least one clamp mechanism when the at least one clamp mechanism is engaged with the portion of the standing platform.

Embodiment 15. The device of embodiment 13, wherein the at least one clamp mechanism is adjustable between about two inches in diameter and about five inches in diameter.

Embodiment 16. The device of embodiment 7, wherein the central unit comprises a storage chamber.

Embodiment 17. The device of embodiment 7, wherein the fire-suppressant material comprises a fireproof sealant comprising one or more of: caulk, foam, silicone, and putty.

Embodiment 18. The device of embodiment 7, wherein the one or more fixed points are located beneath a bottom surface of the bottom layer of the central unit.

Embodiment 19. The device of embodiment 7, wherein the rod is attached to the central unit at the one or more fixed points by one or more brackets.

Embodiment 20. The device of embodiment 7, wherein the rod is fixed at least partially within the bottom layer of the central unit.

Embodiment 21. An electric scooter with balance assistance and fireproofing, the scooter comprising: a scooter body comprising a standing platform and a battery at least partially embedded within the standing platform; and a balance assistance and fireproofing device configured to be attached to the scooter body, the device comprising: a central unit, wherein the central unit comprises a fire-suppressant material, the central unit is attached to the standing platform, and the central unit is configured to extend horizontally outward from the standing platform; at least one a clamp mechanism situated between the top layer and the bottom layer of the central unit; a rod attached to the central unit at one or more fixed points; and two wheels attached to the rod such that each wheel is situated on a diametrically opposite side of the standing platform from the other wheel.

Embodiment 22. The scooter of embodiment 21, wherein the central unit is connected to a portion of the standing platform enclosing the battery at least partially embedded within the standing platform.

The invention claimed is:

1. A device configured to be attached to a scooter, the device comprising:
   a first layer removably attached to a second layer, the first layer comprising a first groove located in a middle portion of the first layer that is configured to receive a standing platform of the scooter and at least two second grooves located on opposite sides of the first groove of the first layer, the second grooves configured to receive corresponding protrusions of the second layer, such that the first and second layers surround at least a portion of the standing platform when attached to the scooter, wherein the first layer and/or second layer comprise a fire-suppressant material;
   a rod attached to the first or second layer; and
   two wheels attached to the rod such that the two wheels are situated on opposite sides of the attached first and second layers.

2. The device of claim 1, wherein the first layer and the second layer are configured to slide together such that the second grooves of the first layer engage with the corresponding protrusions of the second layer to surround at least a portion of the standing platform of the scooter.

3. The device of claim 1, wherein the fire-suppressant material comprises a fireproof sealant comprising one or more of: caulk, foam, silicone, and putty.

4. The device of claim 1, wherein the first or second layer comprises one or more brackets and the rod is attached to the one or more brackets.

5. The device of claim 1, wherein the rod is attached to a bottom surface of the second layer.

6. The device of claim 1, wherein the first layer and/or second layer extends laterally outward from the standing platform of the scooter when attached to the scooter.

7. The device of claim 1, wherein the standing platform comprises a battery and at least a portion of the standing platform comprising the battery is surrounded by the first and second layers.

8. A scooter system comprising:
   a scooter comprising a standing platform and a battery at least partially embedded within the standing platform; and
   a device configured to be attached to the scooter, the device comprising:
      a first layer removably attached to a second layer, the first layer comprising a first groove located in a middle portion of the first layer that is configured to receive the standing platform of the scooter and at least two second grooves located on opposite sides of the first groove of the first layer, the second grooves configured to receive corresponding protrusions of the second layer, such that the first and second layers surround at least a portion of the standing platform of the scooter when attached to the scooter, wherein the first layer and/or second layer comprise a fire-suppressant material;
      a rod attached to the first or second layer; and
      two wheels attached to the rod such that the two wheels are situated on opposite sides of the attached first and second layers.

9. The scooter system of claim 8, wherein the first layer and the second layer are configured to slide together such that the second grooves of the first layer engage with the corresponding protrusions of the second layer to surround at least a portion of the standing platform of the scooter.

10. The scooter system of claim 8, wherein the fire-suppressant material comprises a fireproof sealant comprising one or more of: caulk, foam, silicone, and putty.

11. The scooter system of claim 8, wherein the rod is attached to a bottom surface of the second layer.

12. The scooter system of claim 8, wherein the first layer and/or second layer extends laterally outward from the standing platform of the scooter when attached to the scooter.

13. The scooter system of claim 8, wherein the standing platform comprises a battery and at least a portion of the standing platform comprising the battery is surrounded by the first and second layers.

* * * * *